United States Patent [19]

Siddall et al.

[11] 4,059,070

[45] * Nov. 22, 1977

[54] MILKING INFLATIONS

[75] Inventors: Don F. Siddall, Bath; Vincent L. Hoffman, Akron, both of Ohio

[73] Assignee: Hi-Life Rubber Co., Inc., Johnson Creek, Wis.

[*] Notice: The portion of the term of this patent subsequent to May 9, 1989, has been disclaimed.

[21] Appl. No.: 202,853

[22] Filed: Nov. 29, 1971

Related U.S. Application Data

[63] Continuation-in-part of Ser. No. 9,197, Feb. 6, 1970, Pat. No. 3,661,120.

[51] Int. Cl.² ............................................. A01J 5/04
[52] U.S. Cl. ................................ 119/14.47; 119/14.49
[58] Field of Search ............... 119/14.47, 14.48, 14.49, 119/14.51, 14.52, 14.53

[56] References Cited

U.S. PATENT DOCUMENTS

| | | | |
|---|---|---|---|
| 2,340,295 | 2/1944 | Bender | 119/14.52 |
| 3,308,788 | 3/1967 | Noorlander | 119/14.47 X |
| 3,474,760 | 10/1969 | Siddall et al. | 119/14.49 |
| 3,557,755 | 1/1971 | Close | 119/14.47 X |
| 3,661,120 | 5/1972 | Siddall et al. | 119/14.49 |
| 3,696,790 | 10/1972 | Albright | 119/14.47 |

Primary Examiner—John F. Pitrelli
Assistant Examiner—Robert P. Swiatek
Attorney, Agent, or Firm—Michael, Best & Friedrich

[57] ABSTRACT

An improvement in milking inflations having a teat-receiving collar wherein the inner periphery of the collar is of generally uniform thickness and the projection of the periphery onto a plane passed perpendicularly to the major axis of the body portion of the inflation has a generally circular configuration with a perimeter of finite length, i.e., the projection is substantially circular. The inner periphery of the collar is formed of a series of contiguous wave forms. If the aforementioned plane is passed through the periphery of the collar, the contiguous wave forms may be considered as representing periodic oscillations above and below the aforementioned plane, the true length of the inner periphery along the wave forms exceeding the length of the projected perimeter.

3 Claims, 3 Drawing Figures

INVENTORS.
DON F. SIDDALL
VINCENT L. HOFFMAN
BY Meyer, Tilberry & Body
ATTORNEYS.

MILKING INFLATIONS

This application is a continuation-in-part application to our copending application Ser. No. 9197, filed Feb. 6, 1970, now U.S. Pat. No. 3,661,120, issued May 9, 1972.

This invention relates to the art of automatic milking equipment and more particularly to an improvement in milking inflations.

Milking inflations of the type improved by this invention are of conventional design, and comprise an elongated, tubular body portion, a generally cylindrical cuff portion merged with one end of the body portion, and a teat-receiving collar extending inwardly from generally the point of merger of the body and cuff portions.

For many years virtually all milking inflations were made of natural or synthetic rubber. More recently, milking inflations made of elastomeric vinyl plastics have made substantial inroads in the market place.

Rubber inflations suffer the disadvantages of being difficult to inspect for cleanliness. Due to the fact that rubber is relatively porous, it absorbs butterfat from the milk. Butterfat causes the rubber to swell, enlarging the pores. After each use the rubber inflation must be cleaned in a caustic solution to dissolve out the absorbed butterfat. This leaves empty pores in a state of enlargement and the surface of the rubber in a weakened structural condition. Constant flexing of the rubber during the milking operation, particularly in the area of teat-enrobing collar, causes the development of stress cracks as the pores begin to communicate with each other due to a flexural failure of the walls separating the pores. Oxidation of the rubber also contributes to the development of stress cracks.

Since rubber is opaque, it is difficult to detect hairline cracks when they develop. This results in rubber inflations being used which are incompletely sanitized, and may also lead to a structural failure of a rubber inflation while in use.

The advent of elastomeric vinyl milking inflations went a long way towards solving the problems associated with rubber inflations. First, vinyl inflations could be made transparent, making it much easier to spot cracks as they developed. Further, vinyl plastics are less porous than rubber, substantially reducing the amount of butterfat absorbed by the plastic. As a result, vinyl inflations could be cleansed with less concentrated caustic solutions than were needed to cleanse the rubber inflations. As a matter of fact, vinyl plastic degrades somewhat when exposed to caustic solutions, so that the use of dilute caustic is important in terms of the longevity of the vinyl inflation. Unfortunately, many farmers feel that their vinyl inflations will not be entirely cleansed unless they use the same high concentration caustic solutions that they had been using for many years in connection with rubber inflations. This accelerates the degradation of the vinyl plastic. As with rubber inflations, cracks develop as a consequence of the continued flexing of the inflation during use, particularly in the area of the teat-enrobing collar.

In recognition of the fact that both rubber and vinyl inflations develop stress cracks first in the vicinity of the teat-enrobing collar, a new collar design has been created which is far more resistant to cracking than any design known to the prior art. The new design is applicable to, and advantageous for, inflations made of vinyl, of rubber or of any other suitable material. The novel design of the invention provides a collar periphery which has a substantially uniform thickness and is free of sharp corners or other stress concentrating features. Thus the flexural forces acting upon the periphery of the collar are distributed substantially uniformly along the collar.

More specifically, in accordance with the present invention, there is provided a milking inflation comprising an elongated, tubular body portion, a generally cylindrical cuff portion merged with one end of the body portion, and a teat-receiving collar extending inwardly from generally the point of merger of the body and cuff portions, and extending conically upwardly beyond the end of the body portion when the cuff portion is folded down over the body portion. The inner periphery of the collar is of generally uniform thickness and when projected onto a hypothetical plane perpendicular to the major or longitudinal axis of the body portion of the inflation, it has a generally circular configuration. The inner periphery of the collar is formed of a series of contiguous wave forms. When the perpendicular plane referred to above is passed through the center of the inner periphery, the contiguous wave forms of the inner periphery of the collar represent periodic oscillations above and below the plane. (All references herein to the "perpendicular plane" shall refer to a hypothetical plane (item P in the Figures) passed perpendicularly to the major or longitudinal axis (item A in the drawings) of the body of the milking inflation [item 14 in the FIGURES] and through the center i.e., the mid-point of the amplitude of the waveform oscillations of the inner periphery of the teat-enrobing collar.) The true length of the inner periphery of the collar along the wave forms exceeds the length of the perimeter projected onto the plane.

If the wave forms formed into the collar are of substantially regular sinusoidal appearance, about one-half the distance along the inner periphery will lie above, and one-half below, the perpendicular plane. This type of regular wave form configuration is disclosed as a preferred embodiment in the aforementioned U.S. Patent. The wave form inner periphery, however, may be shaped so that more than about one-half the length along the inner periphery lies above the plane, and correspondingly, less than one-half lies above the plane, and vice-versa. In any event, because of the wave form configuration of the inner periphery of the collar, a portion thereof will always lie above, and a portion thereof will always lie below, a plane passed through the center of the inner periphery and perpendicularly to the major or longitudinal axis of the body portion of the milking inflation.

It is, therefore, an object of the invention to provide an improved milking inflation.

A further object of the invention is to provide a milking inflation which has greater resistance to stress cracking particularly in the area of the teat-enrobing collar portion.

Still another object of the invention is to provide a milking inflation having a collar portion of generally uniform thickness and free of sharp corners and other stress concentrating features.

Yet another object of the invention is the provision of milking inflation made of either rubber or vinyl plastic or any other suitable material having a collar portion, the inner periphery of which is formed of contiguous wave forms representing periodic oscillations.

These and other objects and advantages will become apparent from the following detailed description of a preferred embodiment of the invention when read in conjunction with the accompanying drawings, in which.

Figure 1:
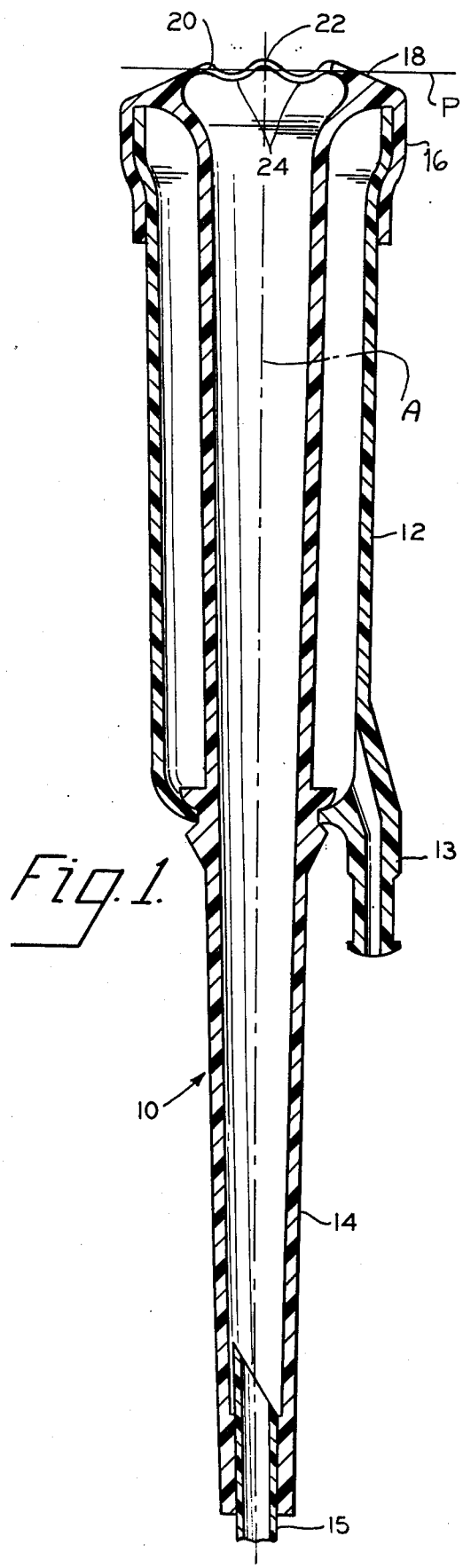
FIG. 1 is a schematic section view of a milking inflation assembly comprising the improved milking inflation of the present invention.

Referring now to the drawings wherein the showings are for purposes of illustrating a preferred embodiment of the invention only, and not for the purpose of limiting the same, FIG. 1 shows a milking inflation assembly comprising a milking inflation designated generally as 10, and rigid shell 12. The shell may be formed from a variety of materials such as metal or glass, but in the preferred embodiment illustrated, it is formed of a synthetic plastic material such as an acrylic resin e.g., methyl methacrylate, a polycarbonate, a polyphenylene, a methylpentene, a polysulfone, a rigid vinyl, etc., and is preferably transparent.

Shell 12 is provided with tube 13 which is connected to a source of pulsating vacuum forming no part of the present invention and, therefore, not illustrated.

Milking inflation 10 comprises tubular body portion 14 the lower open end of which connects to a "claw" shown fragmentarily at 15, which collects milk from a plurality of milking inflations.

The upper end of tubular body portion 14 merges with cylindrical cuff portion 16 and teat-receiving collar 18 extends inwardly from generally the point of merger of body portion 14 and cuff portion 16.

With cuff portion 16 folded down over body portion 14 and around the upper end of shell 12, as illustrated in FIG. 1, collar 18 extends conically upwardly beyond the end of body portion 14.

Figure 2:
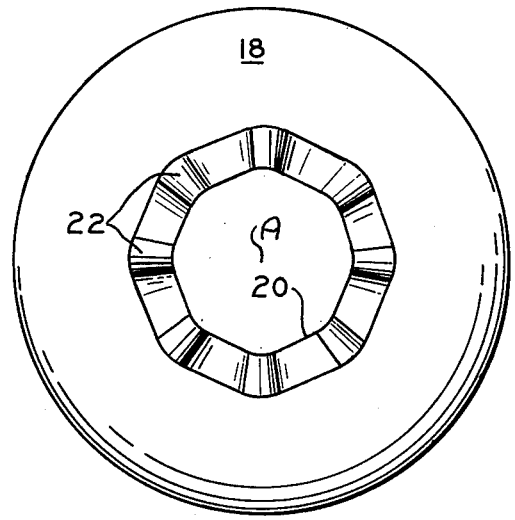
FIG. 2 is a schematic plan view of the collar portion of the milking inflation illustrated in FIG. 1, when in its relaxed position.

The inner periphery of collar 18, designated generally at 20 is substantially of uniform thickness throughout. When projected onto the perpendicular plane P, periphery 20 has a generally circular configuration defined by its projected perimeter, as best seen in FIG. 2. FIG. 2 shows collar 18 in its relaxed position.

Referring again to FIG. 1, it will be seen that inner periphery 20 of collar 18 is formed of a series of contiguous wave forms 22, 24 representing periodic oscillations above (22) and below (24) the perpendicular plane. The true length of inner periphery 20, along wave forms 22, 24 exceeds the length of the perimeter projected onto the perpendicular plane P as aforesaid.

When the wave forms 22, 24 are viewed in cross section as shown in FIG. 1, it is seen that the oscillation 22 above the perpendicular plane P is shorter than the oscillation 24 below the perpendicular plane P, when measured along the plane. Stated otherwise, the duration of oscillation 24 is greater than that of oscillation 22. Accordingly, of the total true length of the inner periphery 20, an unequal, i.e., greater, portion lies below the perpendicular plane P than lies above it. Obviously, if the wave form takes a different shape, such as, the upper oscillations or troughs 22 being greater in length as compared to the lower troughs, then of the total line length along the inner periphery, a greater portion thereof would lie above the plane P than below.

Figure 3:
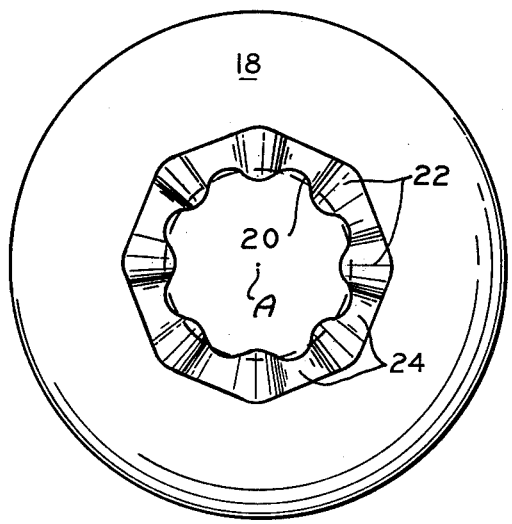
FIG. 3 is a schematic plan view similar to FIG. 2, but showing the collar portion of the inflation in its flexed position.

FIG. 3 shows teat-receiving collar 18 in its flexed position. This configuration occurs when vacuum is pulled on the chamber formed between shell 12 and section of tubular body portion 14 it encases. When collar 18 is flexed downwardly along the major axis of the body portion of the inflation, wave oscillations 22 are drawn inwardly of the inner periphery of the collar, which is shown in dotted lines in the upward or relaxed position. Inner periphery 20 is shown in FIG. 3 as a solid line in the downward or flexed position. This inward projection provides interrupted contact with the teat toward the end of the vacuum stroke due to the wave configuration (solid line in FIG. 3), breaking the vacuum seal and thus preventing the milking inflation from "riding up" on the teat during the milking operation.

In the preferred embodiment illustrated, the wave forms representing periodic oscillations have an amplitude and frequency so that a greater portion of the true length along the inner periphery is below than is above the perpendicular plane P. Variation is permitted, however, including having a greater portion of the true length above rather than below the perpendicular plane P, so long as the wave form of the inner periphery of the collar is free of sharp angles which would cause a stress concentration point.

By the present invention there is provided an improved milking inflation which is less susceptible to the stress cracking which is caused by flexure in use and accelerated by repeated exposure of the inflation to butterfat and caustic. This has been accomplished by providing the milking inflation with a collar portion which is of uniform thickness, free of sharp corners and otherwise devoid of stress concentrating features. Further, the collar is provided with an inner periphery which has a true length exceeding by a substantial margin the projected perimeter of the collar onto the perpendicular plane P. This provides the inner periphery of the collar with reserve length so that it can respond to expansion and contraction forces readily without developing points of high stress concentration.

The present invention has been described in detail in conjunction with certain specific structural embodiments; however, it is to be appreciated that various structural changes may be made in the illustrated embodiments without departing from the intended scope and spirit of the present invention.

We claim:

1. A milking inflation comprising an elongated, tubular body portion, a generally cylindrical cuff portion merged with one end of said body portion and a teat-receiving collar extending inwardly from generally the point of merger of said body and cuff portions, and extending conically upwardly beyond the end of said body portion when said cuff portion is folded down over the former, the inner periphery of said collar (a) being of generally uniform thickness, (b) having a generally circular configuration about its perimeter and (c) being formed of a series of contiguous wave forms free of sharp corners representing periodic oscillations above and below a plane passed through the center of said inner periphery perpendicularly to the major axis of said body portion, so that a portion of the true length of said inner periphery lies above said plane and a portion lies below said plane, said true length of said inner periphery along said wave forms exceeding the finite length of said periphery projected onto said plane, the portion of said true length of said inner periphery lying above said plane being unequal to the portion lying below said plane.

2. The milking inflation of claim 1 wherein the portion of said true length of said inner periphery lying above said perpendicular plane is greater than the portion lying below said plane.

3. The milking inflation of claim 1 wherein the portion of said true length of said inner periphery lying below said perpendicular plane is greater than the portion lying above said plane.

* * * * *